United States Patent
Uemura et al.

(10) Patent No.: US 8,172,466 B2
(45) Date of Patent: May 8, 2012

(54) OPTOELECTRONIC INTERCONNECTION MODULE

(75) Inventors: Hiroshi Uemura, Yokohama (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 311 days.

(21) Appl. No.: 12/648,763

(22) Filed: Dec. 29, 2009

(65) Prior Publication Data

US 2011/0081118 A1   Apr. 7, 2011

(30) Foreign Application Priority Data

Oct. 2, 2009 (JP) ................. 2009-230714

(51) Int. Cl.
*G02B 6/36* (2006.01)
*G02B 6/12* (2006.01)

(52) U.S. Cl. ............... 385/88; 385/14; 385/49; 385/50; 385/89

(58) Field of Classification Search ........................ None
See application file for complete search history.

(56) References Cited

U.S. PATENT DOCUMENTS

| 2006/0062526 | A1* | 3/2006 | Ikeuchi | 385/88 |
| 2010/0206620 | A1* | 8/2010 | Teramoto et al. | 174/254 |
| 2011/0097034 | A1* | 4/2011 | Uemura et al. | 385/14 |

FOREIGN PATENT DOCUMENTS

| JP | 2007-258593 | 10/2007 |
| JP | 2008-159766 | 7/2008 |

\* cited by examiner

*Primary Examiner* — Hemang Sanghavi
(74) *Attorney, Agent, or Firm* — Turocy & Watson, LLP (57) ABSTRACT

An optoelectronic interconnection module capable of performing optical signal transmission and electrical signal transmission, including a flexible optoelectronic interconnection board including an optical interconnection path, electrical wires and electrical connection terminals used for electrically connecting the electrical wires to an exterior at an end portion thereof, an optical semiconductor device mounted on a portion near one-end of the flexible optoelectronic interconnection board, and a bend portion provided in a lengthwise direction of the flexible optoelectronic interconnection board in parallel to a mounting region of the optical semiconductor device.

18 Claims, 5 Drawing Sheets

OPTOELECTRONIC INTERCONNECTION MODULE

CROSS-REFERENCE TO RELATED APPLICATIONS

This application is based upon and claims the benefit of priority from prior Japanese Patent Application No. 2009-230714, filed Oct. 2, 2009, the entire contents of which are incorporated herein by reference.

BACKGROUND

Recently, it is required to enhance the operation speed and reduce noise for signal transmission between LSI chips in mobile communication devices such as personal computers or mobile phones. In accordance with such circumstances, much attention is paid to optoelectronic interconnection attained by combining optical interconnection and electrical wires and having a feature of a high-speed operation and low noise.

As the optoelectronic interconnection, an optoelectronic interconnection array configured by bundling optical fibers and electrical wires, a flexible optoelectronic interconnection board configured by forming an optical waveguide on a flexible printed circuit (FPC) or the like is provided. An optoelectronic interconnection module having electronic parts such as optical semiconductor devices and driver ICs mounted on a flexible optoelectronic interconnection board has a feature that the number of parts used therein is small and the assembling process is easy (for example, JP-A 2008-159766 (KOKAI)). Therefore, the optoelectronic interconnection module is advantageous in cost over the optoelectronic interconnection array module comprising electronic parts such as optical semiconductor devices and driver ICs combined with an optoelectronic interconnection array.

SUMMARY

According to one aspect of this invention, there is provided an optoelectronic interconnection module, comprising a flexible optoelectronic interconnection board comprising an optical interconnection path for optical signal transmission, electrical wires for electrical signal transmission and electrical connection terminals used for electrically connecting the electrical wires to an exterior at an end portion thereof; an optical semiconductor device mounted on a portion near one-end of the flexible optoelectronic interconnection board and optically connected to the optical interconnection path; and a bend portion provided in the flexible optoelectronic interconnection board, and provided in a lengthwise direction of the flexible optoelectronic interconnection board, and provided along a mounting region of the optical semiconductor device.

According to another aspect of this invention, there is provided an optoelectronic interconnection module, comprising a flexible optoelectronic interconnection board comprising an optical interconnection path for optical signal transmission, electrical wires for electrical signal transmission and electrical connection terminals used for electrically connecting the electrical wires to an exterior at an end portion thereof; an optical semiconductor device mounted on a portion near one-end of the flexible optoelectronic interconnection board and optically connected to the optical interconnection path; a driver IC mounted adjacent to the optical semiconductor device on the flexible optoelectronic interconnection board and used for driving the optical semiconductor device; and a bend portion provided in the flexible optoelectronic interconnection board, and provided in a lengthwise direction of the flexible optoelectronic interconnection board, and provided along a mounting region of the optical semiconductor device and driver IC.

DETAILED DESCRIPTION (Comparison Example)

First, this invention is briefly compared with a comparison example to illustrate a difference between this invention and the comparison example.

Figure 7:
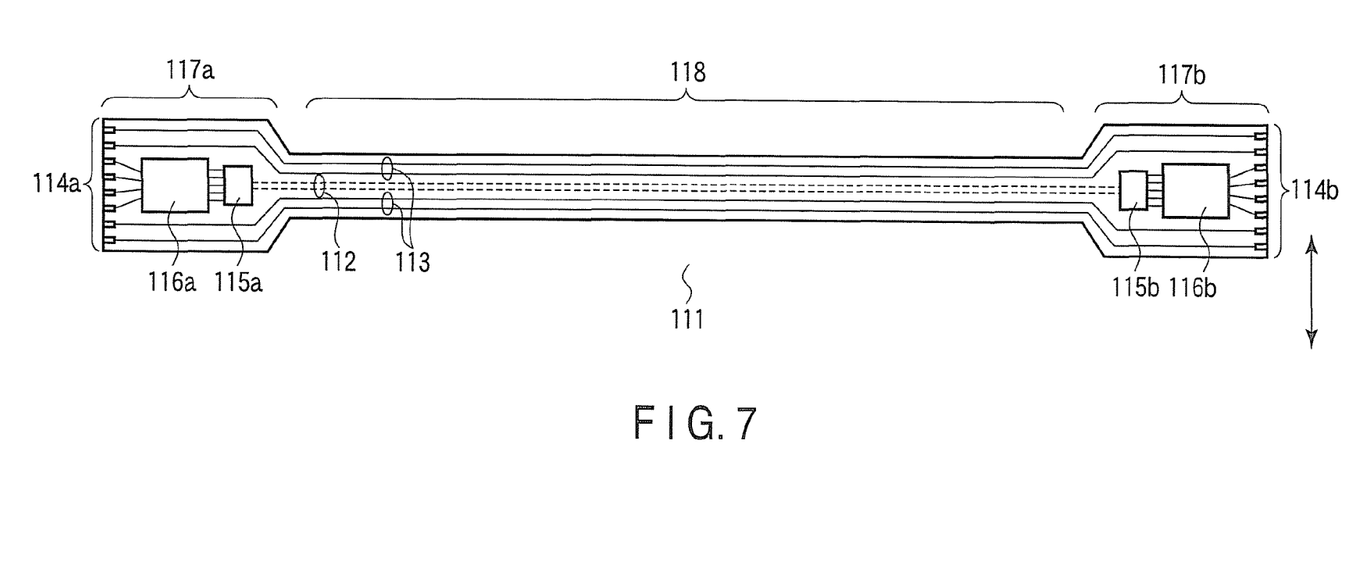
FIG. 7 is a plane view showing the schematic configuration of an optoelectronic interconnection module according to a comparison example.

FIG. 7 shows one comparison example of an optoelectronic interconnection module according to the comparison example. A reference symbol 111 in FIG. 7 denotes a flexible optoelectronic interconnection board, 112 an optical interconnection path, 113 electrical wires, 114a, 114b electrical connection terminals, 115a an optical semiconductor device (light-emitting device), 115b an optical semiconductor device (light-receiving device), and 116a, 116b driver ICs. Further, 117a, 117b denote circuit areas configured by regions on which the optical semiconductor devices 115a, 115b and driver ICs 116a, 116b are mounted and regions on which the electrical connection terminals 114a, 114b are formed. 118 denotes a interconnection area formed in a region that is a region except the circuit areas 117a, 117b and on which the optical interconnection path 112 and electrical wires 113 are formed.

In the optoelectronic interconnection module, since the optical semiconductor devices 115 (115a, 115b) each of which makes conversion between an electrical signal and optical signal and the driver ICs 116 (116a, 116b) that drive the optical semiconductor devices 115 are mounted on the flexible optoelectronic interconnection board 111, the width (the length in the arrow direction in the drawing) of the circuit areas 117 (117a, 117b) becomes larger than the width of the interconnection area 118. Therefore, when the optoelectronic interconnection module is wired in the inside of a small part (for example, a hinge unit of a mobile phone) having a diameter smaller than the width of the circuit area 117, it becomes necessary to bend the circuit area 117 in order to pass the module through the small part.

Figure 8:
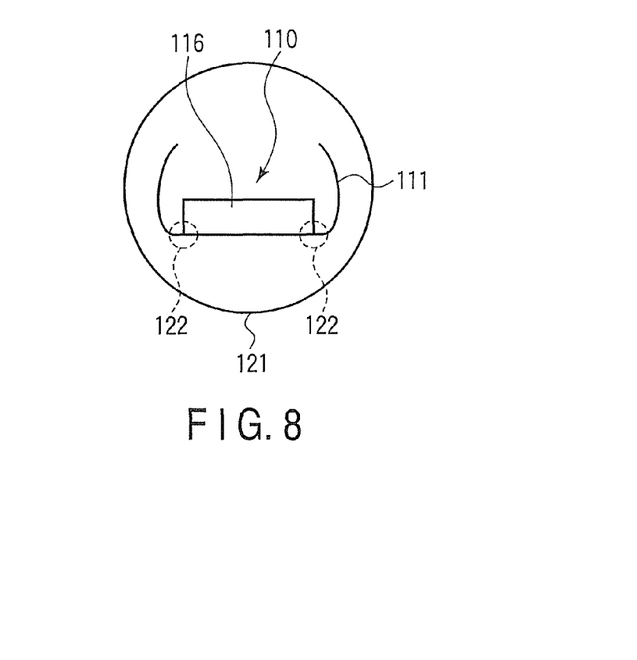
FIG. 8 is a cross-sectional view showing an example of wiring of the optoelectronic interconnection module of FIG. 7 on a small-diameter cylindrical part.

This state is shown in FIG. 8. FIG. 8 is a diagram showing the state in the cross-sectional direction in which the optoelectronic interconnection module is passed through a small-diameter cylindrical part as a small part. A reference symbol 110 denotes an optoelectronic interconnection module and 121 a cylindrical part.

The diameter of the cylindrical part 121 is larger than the width of the interconnection area 118 and smaller than the width of the circuit area 117. Therefore, the flexible optoelectronic interconnection board 111 is bent at portions near the mounting region of the driver IC 116 and passed through the cylindrical part 121. At this time, large stress occurs by bending the flexible optoelectronic interconnection board 111 at portions 122 that lie at both ends of the driver IC 116 and on the boundary between the driver IC 116 and the flexible optoelectronic interconnection board 111. Therefore, connection between the driver IC 116 and the flexible optoelectronic interconnection board 111 may be damaged at this portion or the stress is transmitted to the driver IC 116 to damage the driver IC 116 and there occurs a possibility that the optoelectronic interconnection module 110 will not function correctly. Likewise, the optical semiconductor device 115 may also be damaged and there occurs a possibility that the optoelectronic interconnection module 110 will not function correctly.

In the optoelectronic interconnection module described in (JP-A 2008-159766 (KOKAI)), wiring of the optoelectronic interconnection module to the small part can be made possible by providing a plurality of stiffening plates in a lengthwise direction of the flexible optoelectronic interconnection board when stiffening plates are provided on the end portions of the optoelectronic interconnection module. However, also, in the optoelectronic interconnection module described in (JP-A 2008-159766 (KOKAI)), like the case of FIG. 8, when the optoelectronic interconnection module is bent to wire the optoelectronic interconnection module to the small part, large stress is applied to both end portions of the driver IC and there occurs a possibility that connection between the driver IC and the flexible optoelectronic interconnection board may be broken and the driver IC may be damaged.

In contrast, according to this invention, as will be described later, it is possible to alleviate a load structurally imposed on the optical semiconductor device and driver IC mounted on the optoelectronic interconnection module when the optoelectronic interconnection module is wired in the small part by providing bend portions formed on the flexible optoelectronic interconnection board in the lengthwise direction of the flexible optoelectronic interconnection board in parallel to the mounting region of the optical semiconductor device and driver IC.

Next, this invention is explained in detail with reference to embodiments shown in the drawings.

First Embodiment

Figure 1:
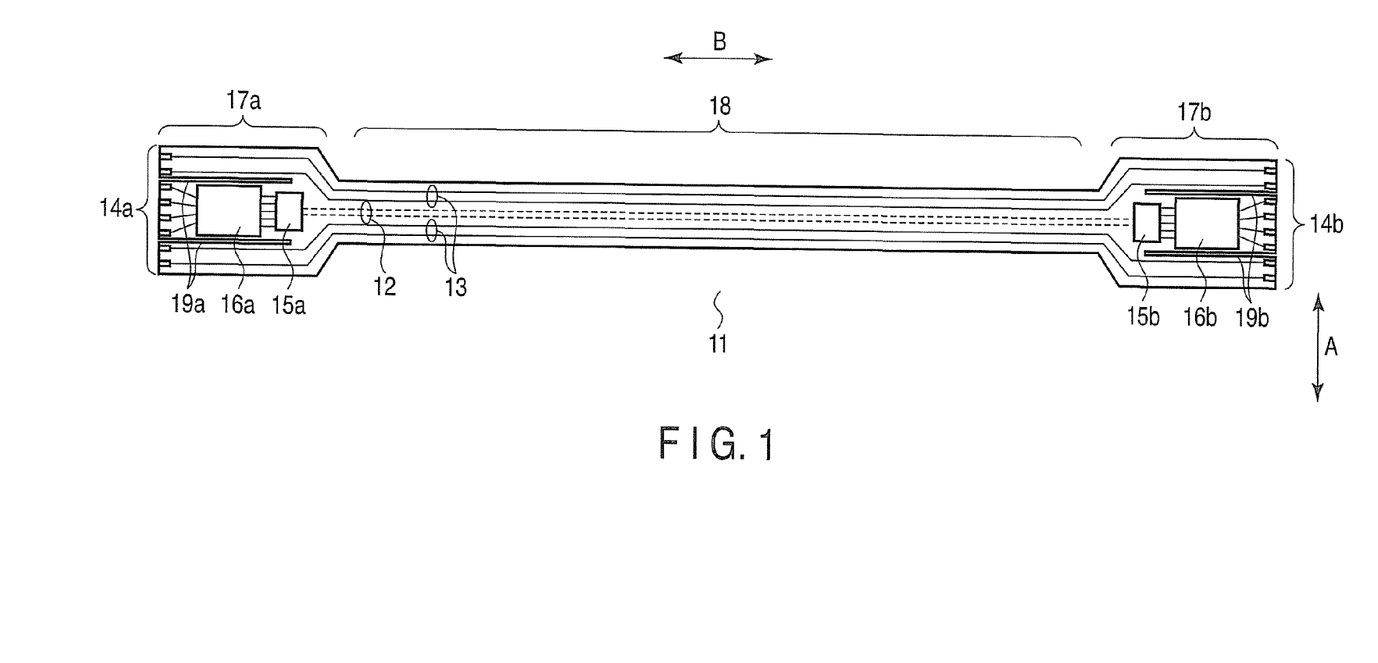
FIG. 1 is a plane view showing the schematic configuration of an optoelectronic interconnection module according to a first embodiment of this invention.

FIG. 1 is a view showing the schematic configuration of an optoelectronic interconnection module according to a first embodiment of this invention.

In FIG. 1, a reference symbol 11 denotes a flexible optoelectronic interconnection board, 12 an optical interconnection path, 13 electrical wires, 14a, 14b electrical connection terminals, 15a an optical semiconductor device (light-emitting device), 15b an optical semiconductor device (light-receiving device), 16a a driver IC that drives the light-emitting device 15a, 16b a driver IC that drives the light-receiving device 15b and amplifies photocurrent supplied from the light-receiving device 15b, and 19a, 19b slit portions (bend portions) formed to lower the degree of rigidity against bending. Further, 17a denotes a circuit area comprising a region on which the optical semiconductor devices 15a and driver IC 16a are mounted and a region on which the electrical connection terminals 14a are formed in the optoelectronic interconnection module. Also, 17b denotes a circuit area comprising a region on which the optical semiconductor devices 15b and driver IC 16b are mounted and a region on which the electrical connection terminals 14b are formed in the optoelectronic interconnection module. In addition, 18 denotes a interconnection area formed in a region that is a region except the circuit areas 17a, 17b and on which the optical interconnection path 12 and electrical wires 13 are formed in the optoelectronic interconnection module.

The flexible optoelectronic interconnection board 11 has flexibility like a flexible printed circuit, for example. The optical semiconductor device (light-emitting device) 15a is provided at a portion near one-end of the flexible optoelectronic interconnection board 11 and the optical semiconductor device (light-receiving device) 15b is provided at a portion near the other end thereof. The optical interconnection path 12 is provided between the light-emitting device 15a and the light-receiving device 15b and the light-emitting device 15a and light-receiving device 15b are optically coupled via the optical interconnection path 12.

Signal transmission and power supply between the optoelectronic interconnection module and the exterior are performed via the electrical connection terminals 14a, 14b. A high-speed electrical signal input via the electrical connection terminals 14a is input to the driver IC 16a that in turn drives the light emitting device 15a. Then, the light emitting device 15a generates an optical signal. The thus generated optical signal is input to the light-receiving device 15b via the optical interconnection path 12 and the light-receiving device 15b generates photocurrent. The driver IC 16b amplifies the photocurrent and outputs the high-speed electrical signal from the electrical connection terminals 14b. Further, a low-speed signal and power input via the electrical connection terminals 14a are output from the electrical connection terminals 14b via the electrical wires 13.

In this embodiment, the light-emitting device 15a is provided on the one-end side of the flexible optoelectronic interconnection board 11, the light-receiving device 15b is provided on the other end side thereof and the signal transmission direction is set in a single direction. However, the light emitting devices 15a and light receiving devices 15b may be provided on both of the one-end side and the other end side to perform bi-directional signal transmission. In this case, the driver ICs 15a, 15b may drive both of the light-emitting devices 15a and light-receiving devices 15b, or both a driver IC for the light emitting device 15a and a driver IC for the light receiving device 15b may be used.

Further, in this embodiment, the optoelectronic interconnection module of a linear form is used, but a module of a curved form or a module of a combination of linear and curved forms may be used. In addition, a module of a combination of linear forms extending in different directions may be used. In this embodiment, the linear optoelectronic interconnection module in which the circuit areas provided at one-end and at the other end to perform signal transmission is used, but this invention is not limited to this case. For example, a flexible optoelectronic interconnection board having a branch and comprising another circuit area at the end of the branch may be used. Further, even if a branch is not provided, another circuit area may be provided between one-end and the other end in addition to the circuit areas provided at one-end and at the other end.

The slit portions 19a, 19b are slit holes penetrating through the flexible optoelectronic interconnection board 11 from the front surface to the back surface. They are provided in parallel to and on both sides of the mounting regions of the optical semiconductor devices 15a, 15b and driver ICs 16a, 16b in the lengthwise direction (in a direction indicated by an arrow B in the drawing) of the flexible optoelectronic interconnection board 11. Further, they are formed to extend from both ends of the flexible optoelectronic interconnection board 11. That is, each of one-end sides of the slit portions 19a, 19b reaches the end portion of the flexible optoelectronic interconnection board 11.

In the optoelectronic interconnection module of this embodiment, the width (the length in a direction indicated by the arrow A in the drawing) of the circuit area 17 (17a, 17b) becomes larger than the width of the interconnection area 18. Therefore, when the optoelectronic interconnection module is wired in the inside of a small part (for example, a hinge unit of a mobile phone) having a diameter smaller than the width of the circuit area 17, it becomes necessary to bend the circuit area 17 in order to pass the module through a cylindrical part. At this time, since the slit portions 19 (19a, 19b) are formed in the circuit area 17, the circuit area 17 can be easily bent at the slit portions 19 that is used as boundaries.

Figure 2:
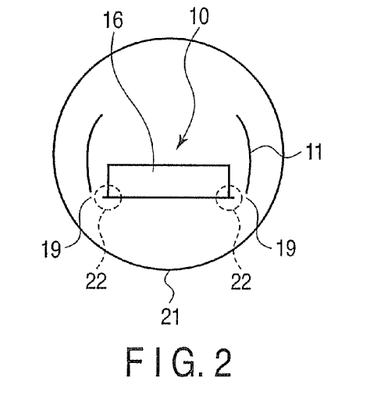
FIG. 2 is a cross-sectional view showing an example of wiring of the optoelectronic interconnection module of FIG. 1 on a small-diameter cylindrical part.

This state is shown in FIG. 2. FIG. 2 is a diagram showing the state in the cross-sectional direction in which the optoelectronic interconnection module is passed through a small-diameter cylindrical part as a small part. A reference symbol 10 denotes an optoelectronic interconnection module and 21 a cylindrical part.

The diameter of the cylindrical part 21 is smaller than the width of the circuit area 17. Therefore, the flexible optoelectronic interconnection board 11 is bent at the slit portions 19 lying near the mounting region of the driver IC 16 and passed through the cylindrical part 21. At this time, the mounting region of the driver IC 16 and the region in which the flexible optoelectronic interconnection board 11 is bent are separated by means of the slit portions 19. Therefore, stress caused by bending the flexible optoelectronic interconnection board 11 is not transmitted to portions 22 that lie at both ends of the driver IC 16 and are boundaries between the driver IC 16 and portions of the flexible optoelectronic interconnection board 11. As a result, it is possible to prevent that connection between the driver IC 16 and the flexible optoelectronic interconnection board 11 may be damaged in this portion, the stress is transmitted to the driver IC 16 to damage the driver IC 16 and the optoelectronic interconnection module 10 will not function correctly. Likewise, it is possible to prevent that the optical semiconductor device 15 is damaged and the optoelectronic interconnection module 10 will not function correctly.

Thus, according to this embodiment, the slit portions 19 (19a, 19b) formed of slit holes formed in parallel to the mounting regions of the optical semiconductor devices 15 (15a, 15b) and driver ICs 16 (16a, 16b) along the lengthwise direction of the flexible optoelectronic interconnection board 11 are provided in the flexible optoelectronic interconnection board 11. As a result, when the optoelectronic interconnection module is wired inside of the small portion, a load structurally imposed on the optical semiconductor devices 15 and driver ICs 16 mounted on the optoelectronic interconnection module can be alleviated and the reliability can be enhanced. Therefore, the operation of lowering the cost and enhancing the performance of information communication devices can be promoted.

In the optoelectronic interconnection module shown in FIG. 1, an example in which the slit portions 19a are provided on one-end side of the optoelectronic interconnection module and the slit portions 19b are provided on the other end side thereof is shown, but it is possible to provide slit portions only on the one-end side (only 19a) or only on the other end side (only 19b). Further, an example in which the slit portions 19a are provided on both sides of the mounting region of the optical semiconductor device 15a and driver IC 16a on the one-end side of the optoelectronic interconnection module is shown, but the slit portions 19a may be provided only on one side of the mounting region of the optical semiconductor device 15a and driver IC 16a. Further, slit portions 19a can be provided in larger number of portions than two of the both side portions. This configuration makes it possible to bend the circuit areas 17a more easily. The same configuration can be made on the other end side.

In the optoelectronic interconnection module shown in FIG. 1, the slits that completely divide the flexible optoelectronic interconnection board 11 are shown as an example of the bend portions. However, half cuts, for example, V-shaped grooves (notches) formed from the front surface or back surface of the flexible optoelectronic interconnection board 11 that do not completely divide the flexible optoelectronic interconnection board 11 may be used as bend portions. Even when the half cut is used as the bend portion, the degree of rigidity against bending can be lowered. Therefore, when the optoelectronic interconnection module is wired inside of the small part, a load structurally imposed on the optical semiconductor devices 15 and driver ICs 16 mounted on the optoelectronic interconnection module can be alleviated. That is, it is possible to attain the effect that the load imposed on the optical semiconductor devices 15 and driver ICs 16 can be alleviated by providing the bend portions of V-shaped grooves.

The optoelectronic interconnection module shown in FIG. 1 may have stiffening plates with larger degree of rigidity than that of the flexible optoelectronic interconnection board 11 on the back side of the flexible optoelectronic interconnection board 11 that is the back side of the surface on which optical semiconductor devices 15 and driver ICs 16 are mounted. The stiffening plates can be used in order to reinforce the circuit areas 17 and to prevent that connection between the optoelectronic semiconductor devices 15 and the driver ICs 16 and the flexible optoelectronic interconnection board 11 may be damaged, for example, when the optical interconnection module is mounted on an assembly board. Therefore, it can be preferable that the stiffening plates are provided at least on the back side of the mounting region of the optical semiconductor devices 15 and driver ICs 16. In this case, providing the stiffening plates except the regions in which slit portions 19 are provided makes it possible to alleviate a load structurally imposed on the optical semiconductor devices 15 and driver ICs 16 mounted on the optoelectronic interconnection module when the optoelectronic interconnection module with the stiffening plates is wired inside of the small part. As the method to provide the stiffening plates except the regions in which slit portions 19 are provided, a plurality of small area stiffening plates may be used, or slits may be provided on the stiffening plates.

Second Embodiment

Figure 3:
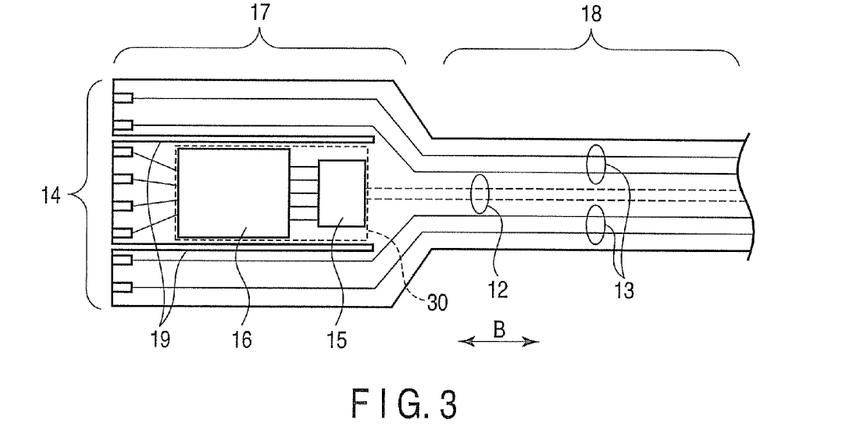
FIG. 3 is a plane view showing the schematic configuration of an optoelectronic interconnection module according to a second embodiment of this invention.

FIG. 3 is a view showing the schematic configuration of an optoelectronic interconnection module according to a second embodiment of this invention.

In FIG. 3, only one-end side of the optoelectronic interconnection module is shown and the other end side thereof is omitted. However, the other end side thereof that is not shown in the drawing may be formed with the same configuration as or the configuration different from that of the one-end side shown in the drawing. In the following drawings, the same symbols are attached to the same portions as those of FIG. 1 and the detailed explanation thereof is omitted.

This embodiment is different from the first embodiment in that the slit portions 19 are formed from one end to the other end of the line that is moved from the B direction sides of the mounting region of optical semiconductor device 15 and driver IC 16 in the orthogonal direction of the B direction and they have the length larger than the B direction length of a mounting region 30 of the optical semiconductor device 15 and driver IC 16. Therefore, when the optoelectronic interconnection module is wired in a small-diameter cylindrical part, a load structurally imposed on the optical semiconductor device 15 and driver IC 16 mounted on the optoelectronic interconnection module can be more stably alleviated.

Third Embodiment

Figure 4:
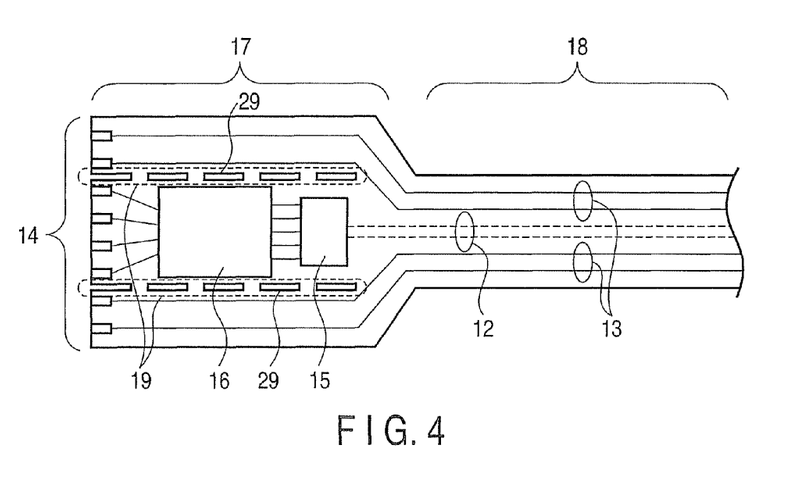
FIG. 4 is a plane view showing the schematic configuration of an optoelectronic interconnection module according to a third embodiment of this invention.

FIG. 4 is a view showing the schematic configuration of an optoelectronic interconnection module according to a third embodiment of this invention.

In FIG. 4, only one-end side of the optoelectronic interconnection module is shown and the other end side thereof is omitted. However, the other end side thereof that is not shown in the drawing may be formed with the same configuration as or the configuration different from that of the one-end side shown in the drawing.

This embodiment is different from the first and second embodiments in that each slit portion 19 comprises a plurality of slits 29 whose length is smaller than the length (in the horizontal direction of the drawing sheet) of the slit portion 19. Therefore, when the optoelectronic interconnection module is wired in a small-diameter cylindrical part, a load structurally imposed on the optical semiconductor device 15 and driver IC 16 mounted on the optoelectronic interconnection module can be alleviated and the following effect can also be attained. That is, it is possible to prevent that the circuit area 17 of the optoelectronic interconnection module is dispersed to degrade the handling property by introducing the slit portions 19 and that the process performed after this becomes difficult.

Fourth Embodiment

Figure 5:
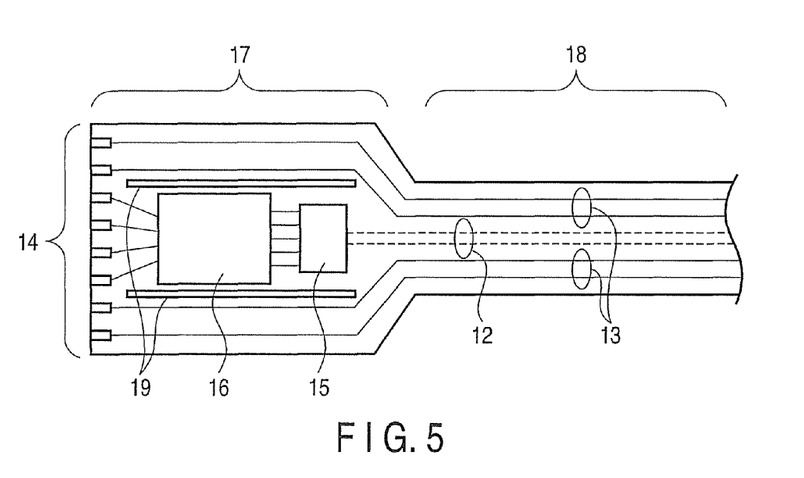
FIG. 5 is a plane view showing the schematic configuration of an optoelectronic interconnection module according to a fourth embodiment of this invention.

FIG. 5 is a view showing the schematic configuration of an optoelectronic interconnection module according to a fourth embodiment of this invention.

In FIG. 5, only one-end side of the optoelectronic interconnection module is shown and the other end side thereof is omitted. However, the other end side thereof that is not shown in the drawing may be formed with the same configuration as or the configuration different from that of the one-end side shown in the drawing.

This embodiment is different from the first to third embodiments in that the slit portions 19 comprise slits formed to extend from internal portions of the flexible optoelectronic interconnection board 11 with respect to the end portion thereof. Therefore, when the optoelectronic interconnection module is wired in a small-diameter cylindrical part, a load structurally imposed on the optical semiconductor device 15 and driver IC 16 mounted on the optoelectronic interconnection module can be alleviated and the following effect can also be attained. That is, it is possible to prevent that the circuit area 17 of the optoelectronic interconnection module is dispersed to degrade the handling property by introducing the slit portions 19 and that the process performed after this becomes difficult.

Fifth Embodiment

Figure 6:
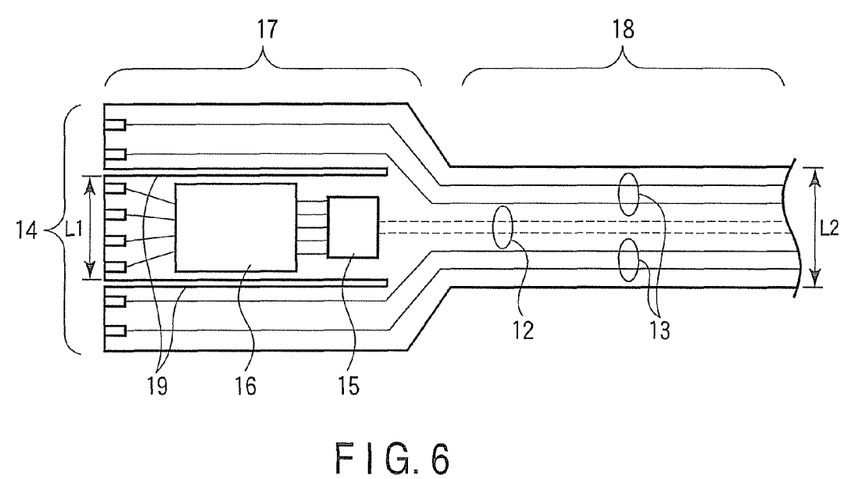
FIG. 6 is a plane view showing the schematic configuration of an optoelectronic interconnection module according to a fifth embodiment of this invention.

FIG. 6 is a view showing the schematic configuration of an optoelectronic interconnection module according to a fifth embodiment of this invention.

In FIG. 6, only one-end side of the optoelectronic interconnection module is shown and the other end side thereof is omitted. However, the other end side thereof that is not shown in the drawing may be formed with the same configuration as or the configuration different from that of the one-end side shown in the drawing.

This embodiment is different from the first to fourth embodiments in that the width (L1 in the drawing) of a region that is a region of the circuit area 17 with the slit portions 19 used as boundaries and contains the mounting region of the optical semiconductor device 15 and driver IC 16 is not larger than the width (L2 in the drawing) of the interconnection area 18. As a result, the optoelectronic interconnection module can be wired in a small part with a diameter not larger than the width of the interconnection area 18. Therefore, the optoelectronic interconnection module can be used in an electronic device comprising a cylindrical part with a smaller diameter.

(Modification)

This invention is not limited to the above embodiments. As the light-emitting device that is an optical semiconductor device, various types of light-emitting devices such as light-emitting diodes or semiconductor lasers can be used. As the light-receiving device that is an optical semiconductor device, various types of light-receiving devices such as PIN photodiodes, MSM photodiodes, avalanche photodiodes or photoconductors can be used. Further, the driver IC may be formed by use of various processes such as a CMOS process or BiCMOS process and only a driver circuit may be mounted thereon or it may be formed with various circuit functions in addition to the driver circuit.

The electronic parts mounted on the circuit area are not limited to the optical semiconductor device and driver IC and electronic parts such as chip resistors, capacitors, serializer and deserializer can also be mounted. Further, various processes and modifications can be applied without departing from the main points and technical scopes of these inventions. In addition, the above embodiments can be adequately combined as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An optoelectronic interconnection module, comprising:
a flexible optoelectronic interconnection board comprising an optical interconnection path for optical signal transmission, electrical wires for electrical signal transmission and electrical connection terminals used for electrically connecting the electrical wires to an exterior at an end portion thereof;

an optical semiconductor device mounted on a portion near one-end of the flexible optoelectronic interconnection board and optically connected to the optical interconnection path; and a bend portion provided in the flexible optoelectronic interconnection board, and provided in a lengthwise direction of the flexible optoelectronic interconnection board, and provided along a mounting region of the optical semiconductor device.

2. The module of claim 1, wherein the bend portion comprises a slit provided to penetrate though the flexible optoelectronic interconnection board from a main surface of the flexible optoelectronic interconnection board to a surface opposite to the main surface.

3. The module of claim 1, wherein the bend portion comprises one of a groove formed on a surface side on which the optical semiconductor device is mounted among main surfaces of the flexible optoelectronic interconnection board and a groove formed on a surface side opposite to the surface side on which the optical semiconductor device is mounted among the main surfaces of the flexible optoelectronic interconnection board.

4. The module of claim 1, wherein the bend portion is formed so as to include a region between one end and the other end of a line that is moved from the lengthwise direction sides of the mounting region of the optical semiconductor device in the orthogonal direction of the lengthwise direction, and the bend portion is formed longer than the mounting region of the optical semiconductor device in the lengthwise direction.

5. The module of claim 1, wherein the bend portion includes a plurality of slits shorter than the bend portion in the lengthwise direction.

6. The module of claim 1, wherein the bend portion is formed in an internal portion from an end portion of the flexible optoelectronic interconnection board.

7. The module of claim 1, wherein one-end portion of the bend portion reaches an end portion of the flexible optoelectronic interconnection board.

8. The module of claim 1, wherein the bend portion includes bend portions provided to sandwich the optical semiconductor device.

9. The module of claim 1, wherein the flexible optoelectronic interconnection board comprises a circuit area including a mounting region of the optical semiconductor device and a region on which the electrical connection terminals are formed and a interconnection area including a region that is a region except the circuit area and on which the optical interconnection path and electrical wires are formed, and the bend portion includes bend portions provided on both sides of the optical semiconductor device to sandwich the optical semiconductor device in the circuit area and a distance between the bend portions is not larger than the width of the interconnection area.

10. An optoelectronic interconnection module, comprising:

a flexible optoelectronic interconnection board comprising an optical interconnection path for optical signal transmission, electrical wires for electrical signal transmission and electrical connection terminals used for electrically connecting the electrical wires to an exterior at an end portion thereof;

an optical semiconductor device mounted on a portion near one-end of the flexible optoelectronic interconnection board and optically connected to the optical interconnection path;

a driver IC mounted adjacent to the optical semiconductor device on the flexible optoelectronic interconnection board and used for driving the optical semiconductor device; and a bend portion provided in the flexible optoelectronic interconnection board, and provided in a lengthwise direction of the flexible optoelectronic interconnection board, and provided along a mounting region of the optical semiconductor device and driver IC.

11. The module of claim 10, wherein the bend portion comprises a slit provided to penetrate through the flexible optoelectronic interconnection board from a main surface of the flexible optoelectronic interconnection board to a surface opposite to the main surface.

12. The module of claim 10, wherein the bend portion comprises one of a groove formed on a surface side on which the optical semiconductor device and driver IC are mounted among main surfaces of the flexible optoelectronic interconnection board and a groove formed on a surface side opposite to the surface side on which the optical semiconductor device and driver IC are mounted among the main surfaces of the flexible optoelectronic interconnection board.

13. The module of claim 10, wherein the bend portion is formed so as to include a region between one end and the other end of a line that is moved from the lengthwise direction sides of the mounting region of the optical semiconductor device and driver IC in the orthogonal direction of the lengthwise direction, and the bend portion is formed longer than the mounting region of the optical semiconductor device and driver IC in the lengthwise direction.

14. The module of claim 10, wherein the bend portion includes a plurality of slits shorter than the bend portion in the lengthwise direction.

15. The module of claim 10, wherein the bend portion is formed in an internal portion from an end portion of the flexible optoelectronic interconnection board.

16. The module of claim 10, wherein one-end portion of the bend portion reaches an end portion of the flexible optoelectronic interconnection board.

17. The module of claim 10, wherein the bend portion includes bend portions provided to sandwich the optical semiconductor device and driver IC.

18. The module of claim 10, wherein the flexible optoelectronic interconnection board comprises a circuit area including a mounting region of the optical semiconductor device and driver IC and a region on which the electrical connection terminals are formed and a interconnection area including a region that is a region except the circuit area and on which the optical interconnection path and electrical wires are formed, and the bend portion includes bend portions provided on both sides of the optical semiconductor device and driver IC to sandwich the optical semiconductor device and driver IC in the circuit area and a distance between the bend portions is not larger than the width of the interconnection area.

* * * * *